Feb. 9, 1937.    S. J. KRANNAK    2,070,013
LUBRICATING APPARATUS
Filed April 29, 1935
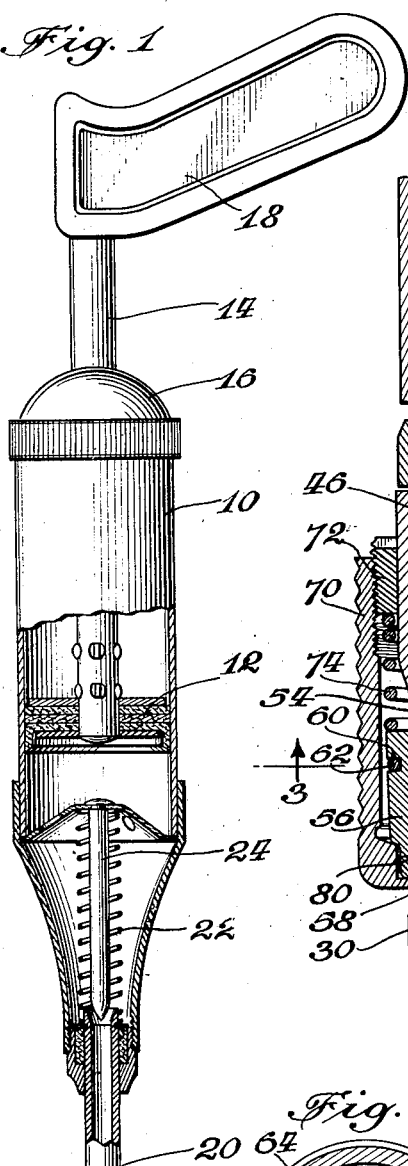
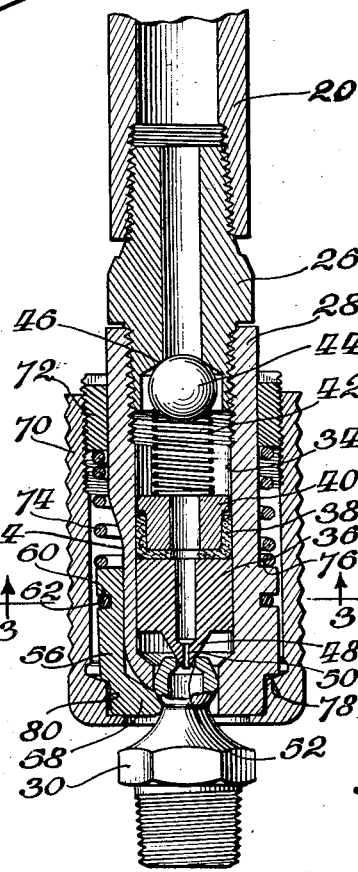
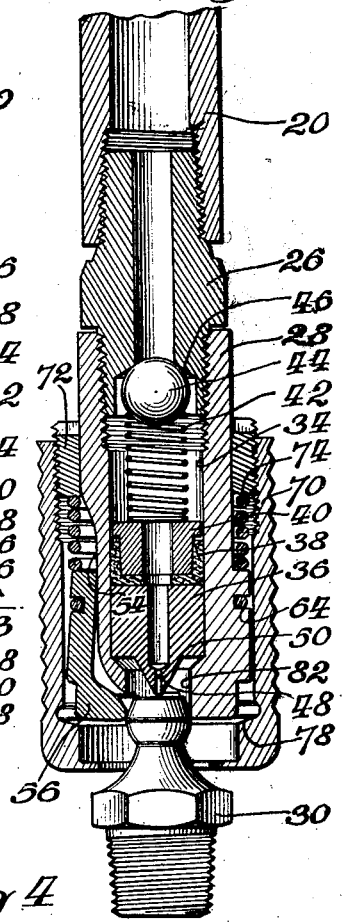
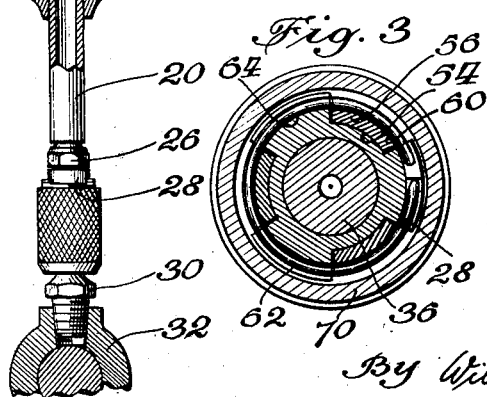
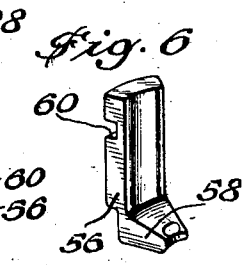
Inventor:
Steven J. Krannak
By Williams, Bradbury, McCaleb & Hinkle
Attys.

Patented Feb. 9, 1937

2,070,013

UNITED STATES PATENT OFFICE 2,070,013

LUBRICATING APPARATUS

Steven J. Krannak, Minneapolis, Minn., assignor to Min-A-Max Co., Inc., Minneapolis, Minn., a corporation of Minnesota Application April 29, 1935, Serial No. 18,755

2 Claims. (Cl. 285—169)

My invention relates generally to high pressure lubricating apparatus, and more particularly to an improved coupler for high pressure grease guns.

The bearings of automobiles and other machinery are generally equipped with lubricant receiving fittings of one of several different types. In one of these types the fittings are formed with a small head having an inlet opening of very small diameter in its end face. A number of different types of couplers have been devised for making a lubricant-tight connection between a grease gun and this type of fitting.

Some couplers for use with this type of fitting have been provided with means for mechanically locking the coupler to the fitting, while others used for the lubrication of bearings equipped with this type of fitting have relied merely upon pressure contact of the end of the fitting with the coupler. The latter type of couplers are usually termed "nozzles" and are illustrated for example in O. U. Zerk Patent No. 1,475,980, and V. A. Boker Patent No. 1,802,700.

Such couplers as have been used to make a mechanical connection with the headed type of lubricant receiving fitting have generally utilized clamping jaws operated by lubricant pressure. In the coupler of my present invention I utilize jaws for mechanically gripping the head of the fitting, but the jaws are moved into locking engagement by means of a spring pressed sleeve. Furthermore, I employ a spring and lubricant pressed sealing member which is slidable in the coupler and has a conical tip of sufficiently small size partially to penetrate the inlet opening of the fitting.

It is thus an object of my invention to provide an improved manually operated coupler for making a lubricant tight connection with a headed lubricant receiving fitting.

Other objects will appear from the following description, reference being had to the accompanying drawing, in which:

Fig. 1 is an elevation of a grease gun, coupler and lubricant receiving fitting, a portion of the grease gun being shown in central longitudinal section;

Fig. 2 is a central longitudinal section of my improved coupler showing the parts in the position assumed when supplying lubricant to a fitting;

Fig. 3 is a transverse sectional view taken on the line 3—3 of Fig. 2;

Fig. 4 is an elevation of the body of the coupler and jaws, illustrating the means utilized for holding the jaws in place;

Fig. 5 is a view similar to Fig. 2 showing the parts in the positions assumed during the operation of disconnecting the coupler from the fitting; and Fig. 6 is a perspective view of one of the jaws.

While in Fig. 1 I have shown a hand operated lubricant compressor of more or less conventional construction, it will be understood that the coupler of my invention may be used with any desired form of high pressure lubricant compressor. For purposes of illustration my invention is shown as applied to a push type grease gun having a barrel 10 in which a piston 12 is reciprocable. The piston is attached to a piston rod 14 which projects through an end cap 16 secured to the end of the barrel and has a suitable handle 18 secured thereto at its extremity.

A high pressure cylinder 20 is reciprocably mounted in the other end of the barrel 10, being normally pressed outwardly by a compression coil spring 22. A high pressure plunger 24 is suitably secured within the barrel 10 and is adapted to enter the high pressure cylinder 20 when the latter is pushed inwardly. The high pressure cylinder 20 is in the form of a tube, the outer end of which is internally threaded to receive a nipple 26, the latter being threaded in the body 28 of the coupler. In Fig. 1 the coupler is shown as attached to a lubricant receiving fitting 30 threaded into the oil hole of a bearing 32.

The body 28 of the coupler is axially bored to provide a cylinder 34 within which a sealing member 36 is freely reciprocable. A cup leather 38 and a cup leather former 40 are pressed against the inner face of the sealing member 36 by a compression coil spring 42, the inner end of which engages a ball check valve 44 and normally presses the latter against its seat 46 formed within the nipple 26. The sealing member 36 has a substantially conical tip 48 provided with a small diameter discharge passageway 50. The conical tip 48 is of sufficiently small diameter that it may enter the inlet opening 52 of the lubricant receiving fiting 30. The external surface of the body 28 has a plurality of grooves 54 formed therein extending substantially from the mid portion of the body to the outer end thereof. In the form illustrated three such grooves 54 are shown, being best illustrated in Fig. 3. These grooves are conformed to receive jaws 56.

Each of the jaws 56 has an inwardly projecting fitting engaging portion 58 which has an inner surface conformed to contact with the lower surface of the head of the fitting, and is provided with an arcuate groove 60 to receive a spring wire 62. The portions of the body 28 intermediate the jaws are likewise provided with grooves 64 which register with the grooves 60 of the jaws, as best illustrated in Fig. 4. The spring wire 62 is in the form of a substantially complete annulus and has a hook-shaped end 66 anchored in a hole 68. A sleeve 70 surrounds the jaws 56, and the lower portion of the body 28, and is guided for reciprocatory sliding movement on the body by a ring 72 which is threaded in the upper end of the sleeve. A coil spring 74 is compressed between the ring 72 and a shoulder 76 formed on the body 28, portions of the spring also resting upon the inner ends of the jaws 56. The outer end of the sleeve 70 has an inwardly projecting annular shoulder 78 which is adapted to engage in complementally shaped recesses 80 formed in the jaws 56 and in the outer end of the body 28.

In applying the coupler to a lubricant receiving fitting the sleeve 70 is pushed inwardly relative to the body 28 to the position in which it is shown in Fig. 5, and the coupler as a whole pressed against a lubricant receiving fitting. The jaws in engaging the end of the fitting will be moved outwardly to the position in which they are shown in Fig. 5, thus permitting the head of the fitting to enter a guiding opening 82 formed in the outer end of the body 28. The body 28 is then moved toward the fitting, causing engagement of the conical tip 48 with the fitting, and moving the sealing member 36 inwardly from the position shown in Fig. 5, to the position in which it is shown in Fig. 2.

The sleeve 70 may then be released, whereupon the spring 74 will retract the sleeve, causing the shoulder 78 thereof to engage the jaws 56 and cam the latter inwardly to the position shown in Fig. 2, in which position the sleeve locks the jaws against radial outward movement. When in this position it will be impossible to separate the coupler from the fitting by pulling on the body 28. Upon applying lubricant pressure the lubricant will be forced past the check valve 46 and exert pressure upon the cup leather 38 and thus press the sealing member 36 outwardly. The lubricant pressure is substantially concentrated upon the surface of contact between the tip 48 and the edge of the fitting surrounding its inlet opening, so that a very high unit pressure is obtained, and as a result leakage of lubricant prevented.

After sufficient lubricant has been forced into the bearing to be lubricated, the coupler may be disconnected from the fitting by pushing the sleeve 70 outwardly relative to the body 28, thereby releasing the jaws 56. When the jaws are no longer held by the shoulder 78 of the sleeve the coupler may be pulled away from the fitting since the latter will readily cam the jaws radially outwardly.

The coupler of my invention is simple in construction, may be economically manufactured, and is very serviceable and durable even when subjected to hard usage. It will be effective to make a sealing connection with a fitting under substantially any reasonable pressure and may be easily and quickly applied to and removed from the fitting.

Having thus described my invention, what I claim as new and desire to secure by Letters Patent of the United States is:

1. A coupler for high pressure lubricating systems utilizing headed lubricant receiving fittings, comprising a body having a plurality of longitudinally extending grooves upon the external surface thereof, a jaw in each of said grooves, a ring for holding said jaws in position in said grooves, a sleeve surrounding said jaws and longitudinally slidable upon said body, interengaging camming and locking surfaces on said jaws and said sleeve, a spring to force said sleeve in a direction to cause the jaws to be cammed radially inwardly in engagement with a fitting beneath the head thereof, and movable means in said body for making a lubricant tight connection with the fitting.

2. In a high pressure lubricating apparatus of the type employing headed lubricant receiving fittings, the combination of a body having a cylindrical bore and longitudinally extending grooves in the external surface thereof, a jaw positioned in each of said grooves, a ring interlocking said body and said jaws against relative longitudinal movement, a sleeve surrounding said jaws and having means to lock said jaws in position about the head of a lubricant receiving fitting, a spring to hold said sleeve in jaw locking position, and means within said cylindrical bore for making a lubricant tight connection with the fitting.

STEVEN J. KRANNAK.